United States Patent
Hong et al.

(10) Patent No.: US 10,349,449 B2
(45) Date of Patent: Jul. 9, 2019

(54) METHOD AND USER EQUIPMENT FOR PERFORMING RANDOM ACCESS PROCEDURE

(71) Applicant: LG ELECTRONICS INC., Seoul (KR)

(72) Inventors: Jongwoo Hong, Seoul (KR); Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/794,523

(22) Filed: Oct. 26, 2017

(65) Prior Publication Data

US 2018/0124836 A1 May 3, 2018

Related U.S. Application Data

(60) Provisional application No. 62/414,797, filed on Oct. 30, 2016.

(51) Int. Cl.
*H04W 74/08* (2009.01)
*H04W 72/04* (2009.01)
*H04W 72/12* (2009.01)
*H04W 74/00* (2009.01)
*H04W 48/16* (2009.01)

(52) U.S. Cl.
CPC ..... *H04W 74/0833* (2013.01); *H04W 72/042* (2013.01); *H04W 72/048* (2013.01); *H04W 72/1289* (2013.01); *H04W 74/006* (2013.01); *H04W 74/008* (2013.01); *H04W 74/0866* (2013.01); *H04W 48/16* (2013.01)

(58) Field of Classification Search
CPC ............ H04W 74/0833; H04W 48/16; H04W 72/042; H04W 72/048; H04W 72/1289; H04W 28/0215; H04W 74/08; H04W 74/0866; H04W 74/0875; H04W 74/0883; H04W 74/0891
See application file for complete search history.

(56) References Cited

U.S. PATENT DOCUMENTS

| | | | | |
|---|---|---|---|---|
| 2012/0113938 A1* | 5/2012 | Larsson | ............. | H04W 74/008 370/329 |
| 2013/0272231 A1* | 10/2013 | Dinan | ................... | H04W 52/34 370/329 |
| 2013/0315094 A1* | 11/2013 | Vannithamby | .......... | H04W 4/70 370/252 |

(Continued)

*Primary Examiner* — Magdi Elhag
(74) *Attorney, Agent, or Firm* — Dentons US LLP

(57) ABSTRACT

In the present invention, a user equipment (UE) receives physical random access channel (PRACH) configuration information. The UE determines a part of PRACH resources among PRACH resources configured based on the PRACH configuration information, if a random access (RA) procedure is triggered. The UE performs the RA procedure using only the determined part of the PRACH resources. The PRACH configuration information includes a periodicity value N, expressed in number of configured PRACH resources. The determined part of PRACH resources are every N-th configured PRACH resource, starting from a specific PRACH resource for the RA procedure, among the PRACH resources configured based on the PRACH configuration information.

14 Claims, 7 Drawing Sheets

(56) References Cited

U.S. PATENT DOCUMENTS

| | | | |
|---|---|---|---|
| 2014/0198742 A1* | 7/2014 | Baldemair | H04W 74/0833 370/329 |
| 2015/0156760 A1* | 6/2015 | Yu | H04W 72/042 370/330 |
| 2015/0264718 A1* | 9/2015 | Yu | H04W 72/02 370/329 |
| 2016/0021681 A1* | 1/2016 | Nan | H04W 74/0866 370/329 |
| 2016/0105910 A1* | 4/2016 | Wang | H04W 56/0045 370/329 |
| 2016/0330768 A1* | 11/2016 | Hu | H04W 74/006 |
| 2017/0332358 A1* | 11/2017 | Park | H04W 72/042 |
| 2017/0367122 A1* | 12/2017 | Baldemair | H04W 74/0833 |
| 2018/0034669 A1* | 2/2018 | Barbieri | H04L 25/02 |
| 2018/0359790 A1* | 12/2018 | Ingale | H04W 8/24 |
| 2019/0045437 A1* | 2/2019 | Krishnamoorthy | H04W 52/0216 |

* cited by examiner

FIG. 4
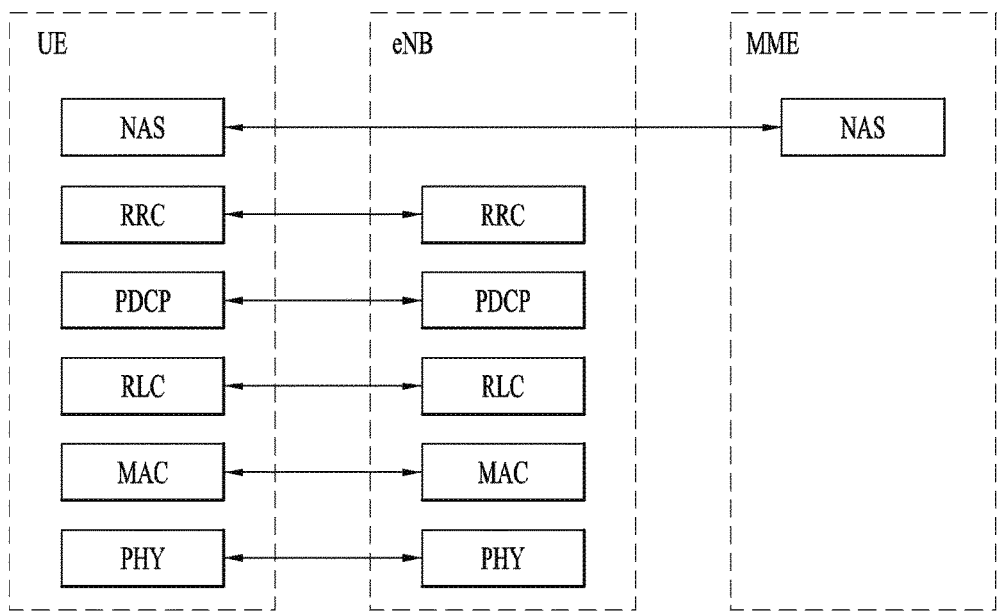
(a) Control-Plane Protocol Stack
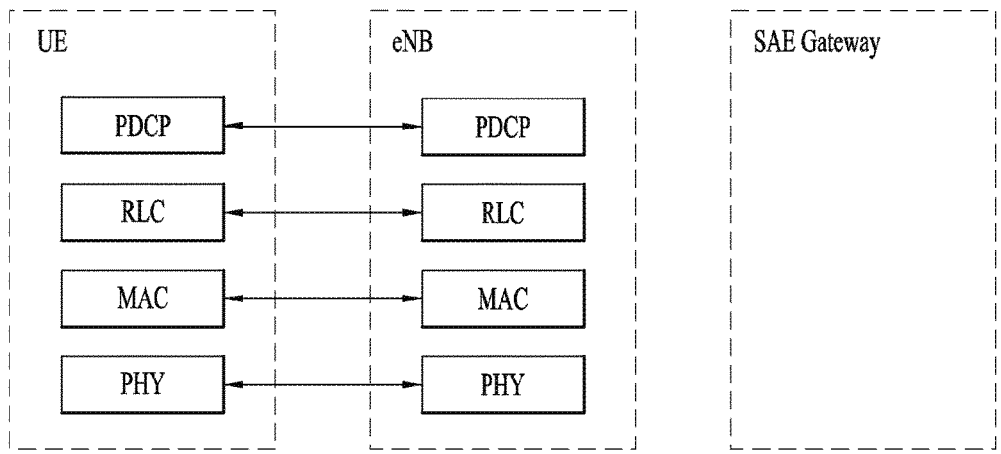
(b) User-Plane Protocol Stack

METHOD AND USER EQUIPMENT FOR PERFORMING RANDOM ACCESS PROCEDURE

CROSS-REFERENCE TO RELATED APPLICATIONS

This application claims the benefit of U.S. Provisional Application Ser. No. 62/414,797, filed on Oct. 30, 2016, the contents of which are all hereby incorporated by reference herein in their entirety.

TECHNICAL FIELD

The present invention relates to a wireless communication system, and more particularly, to a method for performing random access procedure and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

Recently, the "narrowband internet of things (NB-IoT)" technology was standardized across 3GPP. The aim was to specify a radio access for the cellular internet of things, based to a great extent on a non-backward-compatible variant of E-UTRA, which addresses improved indoor coverage, support for massive number of low throughput devices, low delay sensitivity, ultra low device cost, low device power consumption and (optimised) network architecture. The NB-IoT delivers the key functionalities, including support of non-realtime voice, to enable 3GPP systems to penetrate the ultra-low cost, extended coverage IoT marketplace. The market for machine communications is now much in demand from operators and governments and reflects the rapid spread and high ambitions for connecting large numbers of such devices with the advantages of cellular networks.

In addition, a communication system design considering a service/UE sensitive to reliability and latency is being discussed. The introduction of next-generation radio access technology (RAT), which takes into account such advanced mobile broadband communication, massive machine type communication (mMCT), and ultra-reliable and low latency communication (URLLC), is being discussed.

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

Also, a new scheme for effectively serving UEs in the wireless communication system is required.

The technical objects that can be achieved through the present invention are not limited to what has been particularly described hereinabove and other technical objects not described herein will be more clearly understood by persons skilled in the art from the following detailed description.

SUMMARY

In an aspect of the present invention, provided herein is a method of performing, by a user equipment (UE), a random access (RA) procedure in a wireless communication system. The method comprises: receiving, by the UE, physical random access channel (PRACH) configuration information; determining, by the UE, a part of PRACH resources among PRACH resources configured based on the PRACH configuration information, if a RA procedure is triggered; and performing, by the UE, the RA procedure using only the determined part of the PRACH resources. The PRACH configuration information include a periodicity value N, expressed in number of configured PRACH resources. The determined part of PRACH resources are every N-th configured PRACH resource, starting from a specific PRACH resource for the RA procedure, among the PRACH resources configured based on the PRACH configuration information.

In another aspect of the present invention, provided herein is a user equipment (UE) for performing a random access (RA) procedure in a wireless communication system. The UE comprises a radio frequency (RF) unit, and a processor configured to control the (RF) unit. The processor may be configured to: control the RF unit to receive physical random access channel (PRACH) configuration information; determine a part of PRACH resources among PRACH resources configured based on the PRACH configuration information, if a RA procedure is triggered; and control the RF unit to perform the RA procedure using only the determined part of the PRACH resources. The PRACH configuration information includes a periodicity value N, expressed in number of configured PRACH resources. The determined part of PRACH resources are every N-th configured PRACH resource, starting from a specific PRACH resource for the RA procedure, among the PRACH resources configured based on the PRACH configuration information.

In each aspect of the present invention, the starting PRACH resource may be a configured PRACH resource occurring first after the RA procedure is triggered.

In each aspect of the present invention, the starting PRACH resource may be determined based on the identity of the UE.

In each aspect of the present invention, the starting PRACH resource may be a K-th configured PRACH resource after the RA procedure is triggered, where K=(the identity of the UE) modulo N.

In each aspect of the present invention, the starting PRACH resource may be a K-th configured PRACH resource after the RA procedure is triggered, where K is a random number among 0, 1, . . . , N−1.

In each aspect of the present invention, N may be an integer larger than 1.

In each aspect of the present invention, the UE may be an NB-IoT UE.

In each aspect of the present invention, a RA preamble of the RA procedure may be transmitted using only the determined part of the PRACH resources.

In each aspect of the present invention, the PRACH configuration information may include a periodicity value indicating time intervals at which the PRACH resources configured based on the PRACH configuration information occur and a start time of the configured PRACH resources.

The above technical solutions are merely some parts of the embodiments of the present invention and various embodiments into which the technical features of the present invention are incorporated can be derived and understood by persons skilled in the art from the following detailed description of the present invention.

According to the present invention, radio communication signals can be efficiently transmitted/received. Therefore, overall throughput of a radio communication system can be improved.

According to an embodiment of the present invention, a low cost/complexity UE can perform communication with a base station (BS) at low cost while maintaining compatibility with a legacy system.

Also, the UE can be implemented at low cost/complexity.

Also, the UE and the BS can perform communication with each other at a narrowband.

Also, delay/latency occurring during communication between a user equipment and a BS may be reduced.

Also, it is possible to efficiently transmit/receive a small amount of data for smart, devices, or efficiently transmit/receive data occurring at a low frequency.

Also, massive UEs can be served effectively served in the wireless communication system.

Also, signals in a new radio access technology system can be transmitted/received effectively.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWING

The accompanying drawings, which are included to provide a further understanding of the invention, illustrate embodiments of the invention and together with the description serve to explain the principle of the invention.

FIG. 4 is a diagram showing a control plane and a user plane of a radio interface protocol between a UE and an E-UTRAN based on a 3GPP radio access network standard.

DETAILED DESCRIPTION

Figure 1:
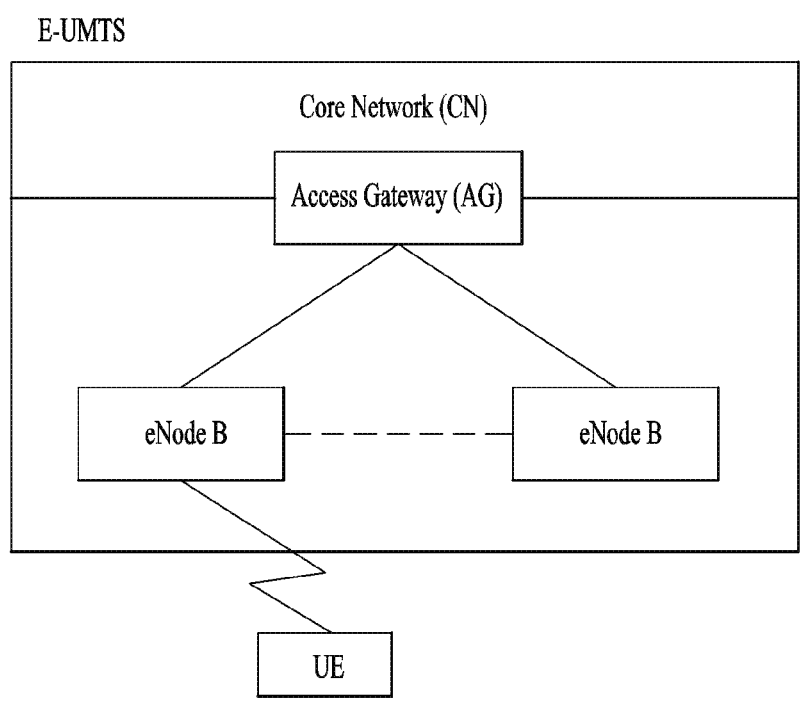
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC).

Although the UE is in RRC-CONNECTED state, if it is not configured by carrier aggregation or does not support carrier aggregation, a single serving cell configured by the Pcell only exists.

In the present invention, "PDCCH" refers to a PDCCH, a EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present invention, for dual connectivity operation the term "special Cell" refers to the PCell of the master cell group (MCG) or the PSCell of the secondary cell group (SCG), otherwise the term Special Cell refers to the PCell. The MCG is a group of serving cells associated with a master eNB (MeNB) which terminates at least S1-MME, and the SCG is a group of serving cells associated with a secondary eNB (SeNB) that is providing additional radio resources for the UE but is not the MeNB. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, "C-RNTI" refers to a cell RNTI, "G-RNTI" refers to a group RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331 may be referenced.

Figure 2:
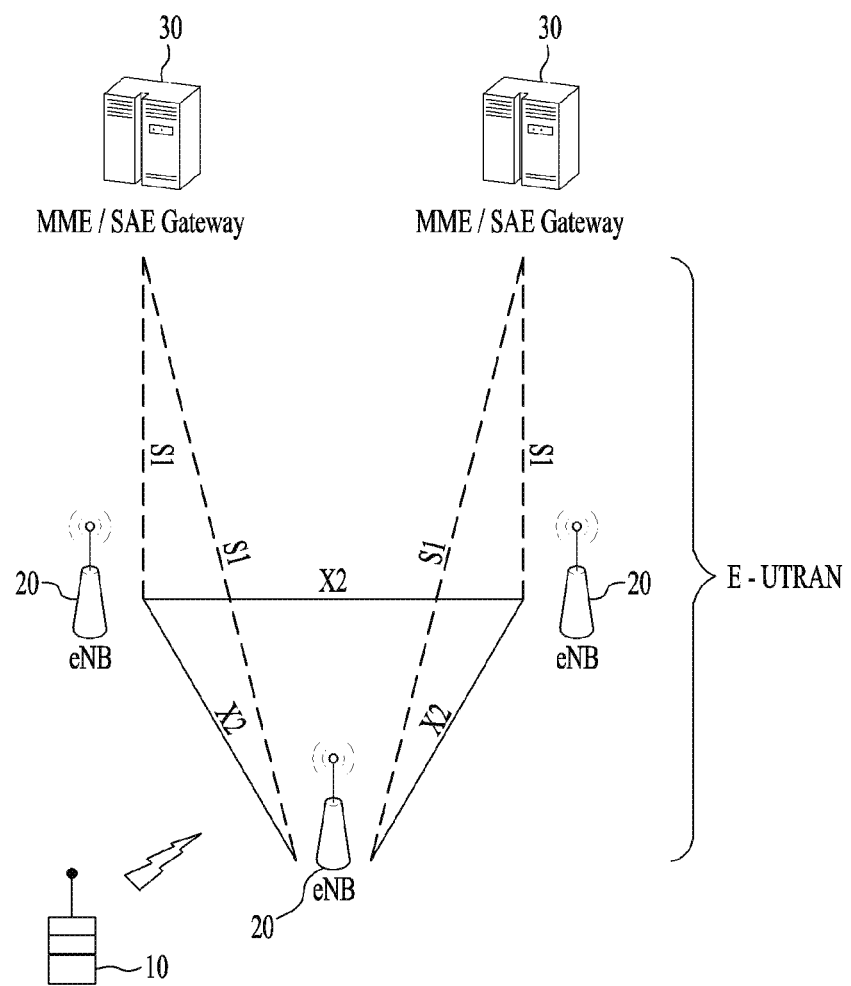
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
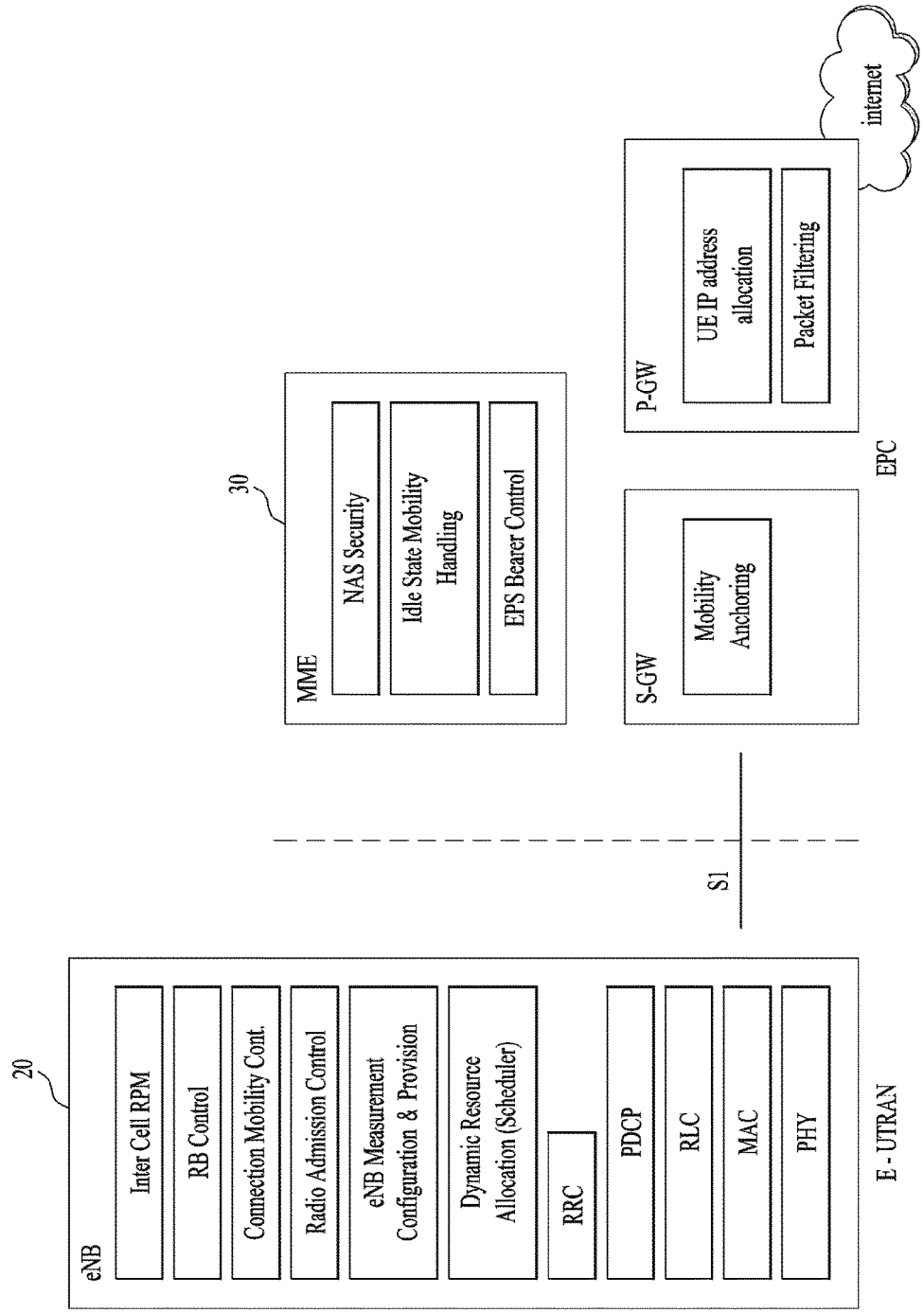
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
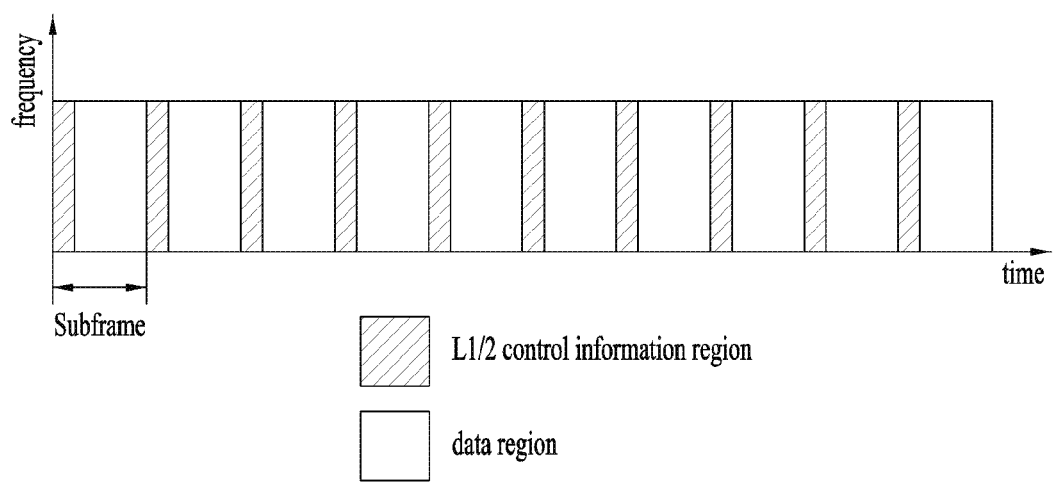
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID). The UE having finished initial cell search may perform the random access procedure to complete access to the eNB. To this end, the UE may transmit a preamble through a physical random access channel (PRACH), and receive a response message which is a response to the preamble through a PDCCH and PDSCH. In the case of contention-based random access, transmission of an additional PRACH and a contention resolution procedure for the PDCCH and a PDSCH corresponding to the PDCCH may be performed. After performing the procedure described above, the UE may perform PDCCH/PDSCH reception and PUSCH/PUCCH transmission as a typical procedure of transmission of an uplink/downlink signal.

The random access procedure is also referred to as a random access channel (RACH) procedure. The random access procedure is common procedure for FDD and TDD, and one procedure irrespective of cell size and the number of serving cells when carrier aggregation (CA) is configured. The random access procedure is used for various purposes including initial access, adjustment of uplink synchronization, resource assignment, and handover. Random access procedures are classified into a contention-based procedure and a dedicated (i.e., non-contention-based) procedure. The contention-based random access procedure is used for general operations including initial access, while the dedicated random access procedure is used for limited operations such as handover. In the contention-based random access procedure, the UE randomly selects a RACH preamble sequence. Accordingly, it is possible that multiple UEs transmit the same RACH preamble sequence at the same time. Thereby, a contention resolution procedure needs to be subsequently performed. On the other hand, in the dedicated random access procedure, the UE uses an RACH preamble sequence that the eNB uniquely allocates to the UE. Accordingly, the random access procedure may be performed without contention with other UEs.

The contention-based random access procedure includes the following four steps. Messages transmitted in Steps 1 to 4 given below may be referred to as Msg1 to Msg4.

Step 1: RACH preamble (via PRACH) (from UE to eNB)
Step 2: Random access response (RAR) (via PDCCH and PDSCH) (from eNB to UE)
Step 3: Layer 2/layer 3 message (via PUSCH) (from UE to eNB)
Step 4: Contention resolution message (from eNB to UE)

The dedicated random access procedure includes the following three steps. Messages transmitted in Steps 0 to 2 may be referred to as Msg0 to Msg2, respectively. Uplink transmission (i.e., Step 3) corresponding to the RAR may also be performed as a part of the random access procedure. The dedicated random access procedure may be triggered using a PDCCH for ordering transmission of an RACH preamble (hereinafter, a PDCCH order).

Step 0: RACH preamble assignment (from eNB to UE) through dedicated signaling
Step 1: RACH preamble (via PRACH) (from UE to eNB)
Step 2: RAR (via PDCCH and PDSCH) (from eNB to UE)

After transmitting the RACH preamble, the UE attempts to receive a random access response (RAR) within a preset time window. Specifically, the UE attempts to detect a PDCCH with RA-RNTI (Random Access RNTI) (hereinafter, RA-RNTI PDCCH) (e.g., CRC is masked with RA-RNTI on the PDCCH) in the time window. In detecting the RA-RNTI PDCCH, the UE checks the PDSCH for presence of an RAR directed thereto. The RAR includes timing advance (TA) information indicating timing offset information for UL synchronization, UL resource allocation information (UL grant information), and a random UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

In the physical layer, a random access preamble, i.e., RACH preamble consists of a cyclic prefix of length $T_{CP}$ and a sequence part of length $T_{SEQ}$. Namely, the physical layer random access burst consists of a cyclic prefix, a preamble, and a guard time during which nothing is transmitted. $T_{SEQ}$ of $T_{CP}$ depends on the frame structure and the random access configuration. The preamble format is controlled by a higher layer. The following table shows examples of $T_{SEQ}$ of $T_{CP}$.

TABLE 1

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4(see NOTE) | $448 \cdot T_s$ | $4096 \cdot T_s$ |

NOTE:
Frame structure type 2 and special subframe configuration with UpPTS lengths $4384 \cdot T_s$ and $5120 \cdot T_s$ only.

The random access preambles are generated from Zadoff-Chu sequences with zero correlation zone, ZC-ZCZ, generated from one or several root Zadoff-Chu sequences. The random access preamble is transmitted in a UL subframe. The transmission of a random access preamble is restricted to certain time and frequency resources. These resources are referred to as PRACH resources, and enumerated in increasing order of the subframe number within the radio frame and the physical resource blocks in the frequency domain such that index 0 correspond to the lowest numbered physical resource block and subframe within the radio frame. PRACH resources within the radio frame are indicated by a PRACH resource index.

For frame structure type 1 with preamble format 0~3, there is at most one random access resource per subframe. The following table shows examples of preamble formats and subframes in which transmission of the random access preamble is allowed for a configuration given in frame structure type 1. In the following table, SFN denotes a system frame number.

TABLE 2

| PRACH Configuration Index | Preamble Format | SFN | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

The PRACH configuration is given by a higher layer signal (transmitted by the eNB). The following table shows some parameters in the information element (IE) PRACH-ConfigSIB and IE PRACH-Config used to specify the PRACH configuration in the system information and in the mobility control information, respectively. See 3GPP TS 36.331.

TABLE 3

PRACH-Config field descriptions initial-CE-level
Indicates initial PRACH CE level at random access, see 3GPP TS 36.321. If not configured, UE selects PRACH CE level based on measured RSRP level, see 3GPP TS 36.321.
highSpeedFlag TABLE 3-continued PRACH-Config field descriptions Parameter: High-speed-flag, see 3GPP TS 36.211. TRUE corresponds to Restricted set and FALSE to Unrestricted set.
maxNumPreambleAttemptCE
Maximum number of preamble transmission attempts per CE level. See 3GPP TS 36.321.
mpdcch-NarrowbandsToMonitor
Narrowbands to monitor for MPDCCH for RAR, see 3GPP TS 36.213. Field values
(1 . . . maxAvailNarrowBands-r13) correspond to narrowband indices (0 . . . [maxAvailNarrowBands-r13-1]) as specified in 3GPP TS 36.211.
mpdcch-NumRepetition-RA
Maximum number of repetitions for MPDCCH common search space (CSS) for RAR, Msg3 and Msg4, see 3GPP TS 36.211.
mpdcch-startSF-CSS-RA
Starting subframe configuration for MPDCCH common search space (CSS), including RAR, Msg3 retransmission, PDSCH with contention resolution and PDSCH with RRCConnectionSetup, see 3GPP TS 36.211 and 3GPP TS 36.213. Value v1 corresponds to 1, value v1dot5 corresponds to 1.5, and so on.
numRepetitionPerPreambleAttempt
Number of PRACH repetitions per attempt for each CE level, see 3GPP TS 36.211.
prach-ConfigIndex
Parameter: prach-ConfigurationIndex, see 3GPP TS 36.211.
prach-FreqOffset
Parameter: prach-FrequencyOffset, see 3GPP TS 36.211. For TDD the value range is dependent on the value of prach-ConfigIndex.
prach-HoppingConfig
Coverage level specific frequency hopping configuration for PRACH.
prach-HoppingOffset
Parameter: PRACH frequency hopping offset, expressed as a number of resource blocks, see 3GPP TS 36.211.
prach-ParametersListCE
Configures PRACH parameters for each CE level. The first entry in the list is the PRACH parameters of CE level 0, the second entry in the list is the PRACH parameters of CE level 1, and so on.
prach-StartingSubframe
PRACH starting subframe periodicity, expressed in number of subframes available for preamble transmission (PRACH opportunities), see 3GPP TS 36.211 Value sf2 corresponds to 2 subframes, sf4 corresponds to 4 subframes and so on. EUTRAN configures the PRACH starting subframe periodicity larger than or equal to the Number of PRACH repetitions per attempt for each CE level (numRepetitionPerPreambleAttempt).
rootSequenceIndex
Parameter: RACH_ROOT SEQUENCE, see 3GPP TS 36.211.
rsrp-ThresholdsPrachInfoList
The criterion for BL UEs and UEs in CE to select PRACH resource set. Up to 3 RSRP threshold values are signalled to determine the CE level for PRACH, see 3GPP TS 36.213. The first element corresponds to RSRP threshold 1, the second element corresponds to RSRP threshold 2 and so on, see 3GPP TS 36.321. The UE shall ignore this field if only one CE level, i.e. CE level 0, is configured in prach-ParametersListCE.
zeroCorrelationZoneConfig
Parameter: $N_{CS}$ configuration, see 3GPP TS 36.211 for preamble format 0 . . . 3 and 3GPP TS 36.211 for preamble format 4.

The physical layer random access transmission uses a 3.75 kHz sub-carrier spacing and consists of symbol groups with frequency hopping between symbol groups. Each symbol group has a cyclic prefix and a preamble. Symbol groups hop by one or six sub-carriers in frequency, and repetitions of groups of symbol groups hop by a pseudo-random number of sub-carriers in frequency. There are two possible cyclic prefix lengths for the random access transmission symbol groups, suitable for different maximum cell sizes. The following table shows some parameters in the IE NPRACH-ConfigSIB-NB used to specify the NPRACH configuration in the system information. See 3GPP TS 36.331.

TABLE 4

NPRACH-ConfigSIB-NB field descriptions maxNumPreambleAttemptCE
Maximum number of preamble transmission attempts per NPRACH resource. See 3GPP TS 36.321.
npdcch-NumRepetitions-RA
Maximum number of repetitions for NPDCCH common search space (CSS) for RAR, Msg3 retransmission and Msg4, see 3GPP TS 36.213.
npdcch-Offset-RA
Fractional period offset of starting subframe for NPDCCH common search space (CSS Type 2), see 3GPP TS 36.213.
npdcch-StartSF-CSS-RA
Starting subframe configuration for NPDCCH common search space (CSS), including RAR, Msg3 retransmission, and Msg4, see 3GPP TS 36.213.
nprach-CP-Length TABLE 4-continued NPRACH-ConfigSIB-NB field descriptions Cyclic prefix length for NPRACH transmission ($T_{CP}$), see 3GPP TS 36.211. Value us66dot7 corresponds to 66.7 microseconds and value us266dot7 corresponds to 266.7 microseconds.
nprach-NumCBRA-StartSubcarriers
The number of start subcarriers for contention based random access. The UE shall select one of these start subcarriers when randomly selecting a start subcarrier in the preamble selection in 3GPP TS 36.321. The start subcarrier indexes that the UE is allowed to randomly select from are according to the following:
nprach-SubcarrierOffset + [0, nprach-NumCBRA-StartSubcarriers − 1]
nprach-NumSubcarriers
Number of sub-carriers in a NPRACH resource, see 3GPP TS 36.211. In number of subcarriers.
nprach-ParametersList
Configures NPRACH parameters for each NPRACH resource. Up to three PRACH resources can be configured in a cell. Each NPRACH resource is associated with a different number of NPRACH repetitions.
nprach-Periodicity
Periodicity of a NPRACH resource, see 3GPP TS 36.211. Unit in millisecond.
nprach-StartTime
Start time of the NPRACH resource in one period, see 3GPP TS 36.211. Unit in millisecond.
nprach-SubcarrierOffset
Frequency location of the NPRACH resource, see 3GPP TS 36.211. In number of subcarriers, offset from subcarrier 0.
nprach-SubcarrierMSG3-RangeStart
Fraction for calculating the starting subcarrier index of the range reserved for indication of UE support for multi-tone Msg3 transmission, within the NPRACH resource, see 3GPP TS 36.211. Multi-tone Msg3 transmission is not supported for {32, 64, 128} repetitions of NPRACH. For at least one of the NPRACH resources with the number of NPRACH repetitions other than {32, 64, 128}, the value of nprach-SubcarrierMSG3-RangeStart should not be 0.
If nprach-SubcarrierMSG3-RangeStart is equal to {oneThird} or {twoThird} the start subcarrier indexes for the two partitions are given by:
nprach-SubcarrierOffset + [0, floor(nprach-NumCBRA-StartSubcarriers * nprach-SubcarrierMSG3-RangeStart) − 1]
for the single-tone Msg3 NPRACH partition;
nprach-SubcarrierOffset + [floor(nprach-NumCBRA-StartSubcarriers * nprach-SubcarrierMSG3-RangeStart), nprach-NumCBRA-StartSubcarriers − 1]
for the multi-tone Msg3 NPRACH partition;
numRepetionsPerPreambleAttempt
Number of NPRACH repetitions per attempt for each NPRACH resource, See 3GPP TS 36.211.
rsrp-ThresholdsPrachInfoList
The criterion for UEs to select a NPRACH resource. Up to 2 RSRP threshold values can be signalled. The first element corresponds to RSRP threshold 1, the second element corresponds to RSRP threshold 2. See 3GPP TS 36.321. If absent, there is only one NPRACH resource.

The random access procedure is initiated by a PDCCH order, by the MAC sublayer itself or by the RRC sublayer. A random access procedure on an SCell is initiated only by a PDCCH order. If a MAC entity receives a PDCCH transmission consistent with a PDCCH order masked with its C-RNTI, and for a specific serving cell, the MAC entity initiates a random access procedure on this serving cell. For random access on the SpCell a PDCCH order or RRC optionally indicate the ra-PreambleIndex (see 3GPP TS 36.331) and the ra-PRACH-MaskIndex (see 3GPP TS 36.331), except for NB-IoT where the subcarrier index is indicated; and for random access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell. Before the random access procedure can be initiated, the following information for related serving sell is assumed to be available for UEs, unless explicitly stated otherwise: the available set of PRACH resources for the transmission of the random access preamble, prach-ConfigIndex, the groups of random access preambles and the set of available random access preambles in each group (SpCell only), the RA response window size ra-ResponseWindowSize (see 3GPP TS 36.331), the maximum number of preamble transmission preambleTransMax (see 3GPP TS 36.331), the preamble format based offset DELTA_PREAMBLE (see 3GPP TS 36.321), for example.

Referring to 3GPP TS 36.321, the random access procedure is performed as follows:
> Flush the Msg3 buffer;
> set the PREAMBLE_TRANSMISSION_COUNTER to 1;
>> if the UE is an NB-IoT UE, a BL UE or a UE in enhanced coverage:
>> set the PREAMBLE_TRANSMISSION_COUNTER_CE to 1;
>> if the starting enhanced coverage level, or for NB-IoT the initial number of PRACH repetitions, has been indicated in the PDCCH order which initiated the random access procedure, or if the starting enhanced coverage level has been provided by upper layers:
>>> the MAC entity considers itself to be in that enhanced coverage level regardless of the measured RSRP;
>> else:
>>> if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:
>>>> the MAC entity considers to be in enhanced coverage level 3;
>>> else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:

>>>> the MAC entity considers to be in enhanced coverage level 2;
>>> else if the measured RSRP is less than the RSRP threshold of enhanced coverage level 1 as configured by upper layers in rsrp-ThresholdsPrachInfoList then:
>>>> the MAC entity considers to be in enhanced coverage level 1;
>>> else:
>>>> the MAC entity considers to be in enhanced coverage level 0;
> set the backoff parameter value to 0 ms;
> for the RN, suspend any RN subframe configuration;
> proceed to the selection of the random access resource.
The random access resource selection procedure is performed as follows:
> If, except for NB-IoT, ra-PreambleIndex (random access preamble) and ra-PRACH-MaskIndex (PRACH Mask Index) have been explicitly signalled and ra-PreambleIndex is not 000000:
>> the random access preamble and the PRACH Mask Index are those explicitly signalled;
> else, for NB-IoT, if ra-PreambleIndex (random access preamble) has been explicitly signalled and is not 000000:
>> the random access preamble is that explicitly signalled.
> else the random access preamble is selected by the MAC entity as follows:
>> If Msg3 has not yet been transmitted, the MAC entity shall, for NB-IoT UEs, BL UEs or UEs in enhanced coverage:
>>> select the random access preambles group and the PRACH resource corresponding to the selected enhanced coverage level and, in case of NB-IoT, additionally corresponding to the support for multi-tone Msg3 transmission;
>> If Msg3 has not yet been transmitted, the MAC entity shall, except for BL UEs or UEs in enhanced coverage in case preamble group B does not exists, or for NB-IoT UEs:
>>> if random access preambles group B exists and any of the following events occur:
>>>> the potential message size (UL data available for transmission plus MAC header and, where required, MAC control elements) is greater than messageSizeGroupA and the pathloss is less than $P_{CMAX,c}$ (of the Serving Cell performing the random access Procedure)—preambleInitialReceivedTargetPower—deltaPreambleMsg3—messagePowerOffsetGroupB;
>>>> the random access procedure was initiated for the CCCH logical channel and the CCCH SDU size plus MAC header is greater than messageSizeGroupA;
>>>> select the random access preambles group B;
>>> else:
>>>> select the random access preambles group A.
>> else, if Msg3 is being retransmitted, the MAC entity shall:
>>> select the same group of random access preambles as was used for the preamble transmission attempt corresponding to the first transmission of Msg3.
>> randomly select a random access preamble within the selected group. The random function shall be such that each of the allowed selections can be chosen with equal probability;
>> except for NB-IoT, set PRACH Mask Index to 0.
> determine the next available subframe containing PRACH permitted by the restrictions given by the prach-ConfigIndex (except for NB-IoT), the PRACH Mask Index (except for NB-IoT, see subclause 7.3), physical layer timing requirements [2] and in case of NB-IoT selected enhanced coverage level and the support for multi-tone Msg3 transmission (a MAC entity may take into account the possible occurrence of measurement gaps when determining the next available PRACH subframe);
> if the transmission mode is TDD and the PRACH Mask Index is equal to zero:
>> if ra-PreambleIndex was explicitly signalled and it was not 000000 (i.e., not selected by MAC):
>>> randomly select, with equal probability, one PRACH from the PRACHs available in the determined subframe.
>> else:
>>> randomly select, with equal probability, one PRACH from the PRACHs available in the determined subframe and the next two consecutive subframes.
> else:
>> determine a PRACH within the determined subframe in accordance with the requirements of the PRACH Mask Index.
> for NB-IoT UEs, BL UEs or UEs in enhanced coverage, select the ra-ResponseWindowSize and mac-ContentionResolutionTimer corresponding to the selected enhanced coverage level and PRACH.
> proceed to the transmission of the random access preamble.
The random access procedure is performed as follows:
> set PREAMBLE_RECEIVED_TARGET_POWER to preambleInitialReceivedTargetPower DELTA_PREAMBLE+(PREAMBLE_TRANSMISSION_COUNTER−1)*powerRampingStep;
> if the UE is a BL UE or a UE in enhanced coverage:
>> the PREAMBLE_RECEIVED_TARGET_POWER is set to: PREAMBLE_RECEIVED_TARGET_POWER−10*log 10(numRepetitionPerPreambleAttempt);
> if NB-IoT:
>> for the lowest repetition level, the PREAMBLE_RECEIVED_TARGET_POWER is set to:
PREAMBLE_RECEIVED_TARGET_POWER−10*log 10(numRepetitionPerPreambleAttempt)
>> for other repetition levels, the PREAMBLE_RECEIVED_TARGET_POWER is set corresponding to the max power;
> if the UE is an NB-IoT UE, a BL UE or a UE in enhanced coverage:
>> instruct the physical layer to transmit a preamble with the number of repetitions required for preamble transmission corresponding to the selected preamble group (i.e., numRepetitionPerPreambleAttempt) using the selected PRACH corresponding to the selected enhanced coverage level, corresponding RA-RNTI, preamble index or for NB-IoT subcarrier index, and PREAMBLE_RECEIVED_TARGET_POWER.
> else:
>> instruct the physical layer to transmit a preamble using the selected PRACH, corresponding RA-RNTI, preamble index and PREAMBLE_RECEIVED_TARGET_POWER.
As stated before, in the LTE system, a UE performs the random access (RA) procedure for various reasons. During the random procedure, a UE may transmit a preamble, then will receive a corresponding RAR. An NB-IoT UE also performs RA procedure. In NB-IoT, there are two types of carriers: anchor carrier and non-anchor carrier. A anchor carrier is a carrier where the UE assumes that NPSS/NSSS/NPBCH/SIB-NB are transmitted, and a non-anchor carrier is a carrier where the UE does not assume that NPSS/NSSS/NPBCH/SIB-NB are transmitted. In the 3GPP Rel-13, the RA procedure was supported only on one anchor carrier.

However, in the 3GPP Rel-14, for the sake of access/congestion control among the multiple carriers, 3GPP has decided to support RA on multiple carriers, i.e., non-anchor carrier as well as anchor carrier.

In previous approach, a UE will receive NPRACH parameters, e.g., NPRACH periodicity (nprach-Periodicity), the number of available preambles (e.g. nprach-NumSubcarriers), the number of preamble attempts (maxNumPreambleAttemptCE) from system information (e.g. NPRACH-ConfigSIB-NB). The configured resources for preamble transmission can be used by all the UEs. Such approach may degrade RA performance (e.g., preamble collisions) since massive UEs can attempt to transmit preambles in every configured NPRACH resource.

Hereinafter, the present invention proposes a method for reducing collision of preambles of UEs. Although the term "NPRACH" is used for describing the present invention, the present invention can be applied to other RACH resources. In other words, although the present invention is described by taking a NB-IoT UE as examples, the present invention is applicable to other types of UEs.

Figure 6:
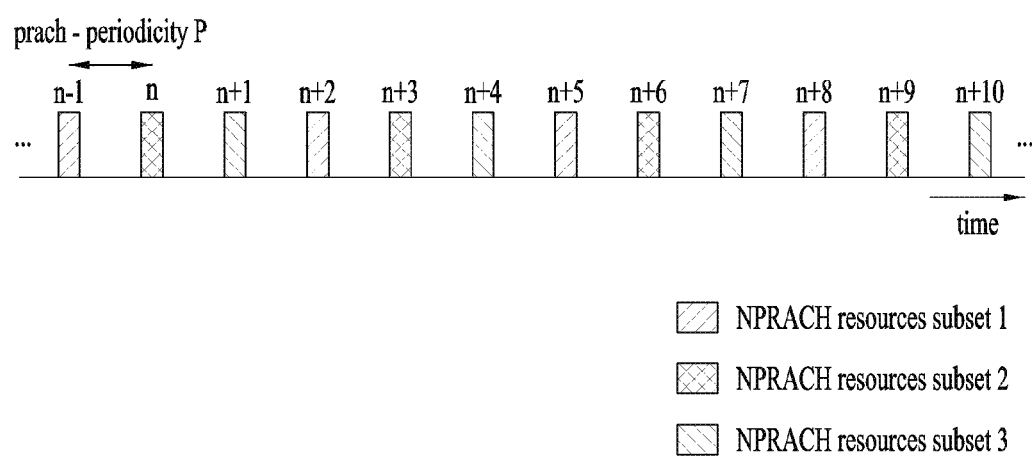
FIG. 6 illustrates an example of random access channel resources according to the present invention.

FIG. 6 illustrates an example of random access channel resources according to the present invention.

In order to reduce collision probability in preamble transmission, the present invention proposes that, when a UE is configured with NPRACH resources for preamble transmission, the UE selects a part of the NPRACH resources among the NPRACH resources configured by an eNB, and the UE uses the selected NPRACH resources for preamble transmission.

In order for an eNB to configure a UE with NPRACH resource(s), the eNB transmits an NPRACH resources configuration to the UE via system information including the following information: time and frequency information of the NPRACH resources; and/or periodicity value N, which is in unit of a number of NPRACH resources in time domain.

Referring to FIG. 6, the eNB may configure a UE with NPRACH resources by NPRACH resource configuration information. The NPRACH configuration information include information on NPRACN periodicity P (i.e., nprach-Periodicity=P ms). The NPRACH periodicity P may be set to 40 ms, 80 ms, 160 ms, 240 ms, 320 ms, 640 ms, 1280 ms, or 2560 ms. In the present invention, the NPRACH resource configuration information may further include periodicity value N.

When the UE receives the NPRACH resource configuration from the eNB, if the NPRACH resources configuration does not include the periodicity value N, the UE configures the NPRACH resources as indicated by the eNB, and then the UE considers that all the configured NPRACH resources are selected NPRACH resources. For example, if the eNB configures a NPRACH resource at time intervals P as shown in FIG. 6, a UE can assume that all the NPRACH resources, including NPRACH resources subset 1, NPRACH resource subset 2 and NPRACH resource subset 3, are available to the UE. Accordingly, if a random access procedure is triggered, the UE may perform the random access procedure using any one of the NPRACH resources shown in FIG. 6. For example, any RA opportunity can be available to the UE.

When the UE receives the NPRACH resource configuration from the eNB, if the NPRACH resources configuration includes the periodicity value N, the UE first configures the NPRACH resources as indicated by the eNB without considering the periodicity value N. When RA is triggered, the UE determines the selected NPRACH resources by selecting a part of configured NPRACH resources. In other words, the UE can determine a subset among the configured NPRACH resources, and consider that only the subset can be available for the UE when the UE performs the RA procedure. Referring to FIG. 6, for example, if N=3, the configured NPRACH resources can be divided into three subsets of NPRACH resources, as shown in FIG. 6. For example, not all the total RA opportunities are available, but 1/N of the total RA opportunities are available for the UE if the NPRACH resources configuration includes the periodicity value N.

When the UE triggers a random access (RA) procedure, the UE performs NPRACH resource selection procedure, where the UE determines the selected NPRACH resources, i.e., NPRACH resources subset by selecting a part of the configured NPRACH resources in time domain considering the periodicity value N as follows. The UE determines a starting NPRACH resource by selecting an earliest configured NPRACH resource, in time domain, which occurs first after selecting a random access preamble. From the starting NPRACH resource, the UE considers that following selected NPRACH resources occur in every N configured NPRACH resources. For example, assume that the configured NPRACH resources are indexed to n, n+1, n+2, . . . , n+N, n+N+1, . . . , n+2N−1, 2N, . . . and so on. The UE selects the configured NPRACH resource indexed to n as the starting NPRACH resource and then the UE further selects the configured NPRACH resources which are indexed to n+N, n+2N, n+3N. All the selected NPRACH resources including the starting NPRACH resource, i.e., the NPRACH resources subset for the UE are evenly/periodically distributed based on the periodicity value N across the configured NPRACH resources. The UE considers that the starting NPRACH resource and the following NPRACH resources are the selected NPRACH resources. Referring to FIG. 6, if the RA procedure is initiated between NPRACH resource n−1 and NPRACH resource n, and if N=3, then the UE may consider the NPRACH resource n as the starting NPRACH resource for the UE, and consider that the NPARCH resources n, n+3, n+6, n+9, and so on are available for the RA procedure. The UE transmits the RA preamble only on the selected NPRACH resources. The UE is not allowed to transmit a RA preamble on a configured NPRACH resource which is not selected in the above. In other words, referring to FIG. 6, if the UE determines that the NPRACH resources subset 1 is actually available NPRACH resources for the UE or RA procedure, any PRACH resource belonging to the NPRACH resources subsets 1 and 2 are not used for RA preamble transmission(s) of the RA procedure.

In another method of the present invention, when the UE determines the starting NPRACH resource, the UE may select a configured NPRACH resource based on the UE identity instead of selecting the earliest configured NPRACH resource in time domain. For example, the UE determines a starting NPRACH resource by selecting a $K^{th}$ NPRACH resource among NPRACH resources occurring after a random access preamble is selected. In other words, if the earliest NPRACH resource occurring after a RA procedure is initiated is NPRACH resource n, then the UE can consider NPRACH resource n+K as the starting NPRACH resource. Assuming that the configured NPRACH resources are indexed to n, n+1, n+2, . . . , n+N, n+N+1, . . . , n+2N−1, n+2N, . . . and so on, if K=2, the UE selects the configured NPRACH resource indexed to 2 as the starting NPRACH resource and then the UE further selects the configured NPRACH resources which are indexed to n+N+2, n+2N+2, n+3N+2 as a NPRACH resources subset for the UE. Referring to FIG. 6, if a RA procedure of a UE is initiated between NPRACH resource n−1 and NPRACH resource n, if N=3 and if the value K of the UE is 1, then the UE may consider the NPRACH resource n+1 as the starting NPARCH resource and consider that the NPARCH resources subset 3 is available for the RA procedure. If the value K of the UE is 2, then the UE may the UE may consider the NPRACH resource n+2 as the starting NPRACH resource and consider that the NPARCH resources subset 1 is available for the RA procedure. In the present invention, K is a value dependent on the UE identity. For example, K='UE identity' modulo N, where the UE identity is, e.g., IMSI, TIMSI, or C-RNTI. For another example, K may be a random number among 0, 1, . . . , N-1.

The UE may perform the NPRACH resource selection procedure (i.e., NPRACP resources subset selection procedure) only one time when the UE firstly triggers the RA procedure after receiving the NPRACH resources configuration. For example, the UE uses the selected NPRACH resources for RA preamble transmissions for all RA procedures until the UE receives a new NPRACH resources configuration from the eNB. Or, the UE may perform determining a NPRACH resources subset whenever the UE triggers the RA procedure. For example, once the UE determines the selected NPRACH resources, the UE uses the selected NPRACH resources for RA preamble transmission within that RA procedure.

The UE can perform the NPRACH resource selection procedure of the present invention regardless of the UE's RRC connection state. Namely, the UE can determine the NPRACH resources subset irrespective of whether the UE is in RRC IDLE or in RRC CONNECTED state.

Figure 7:
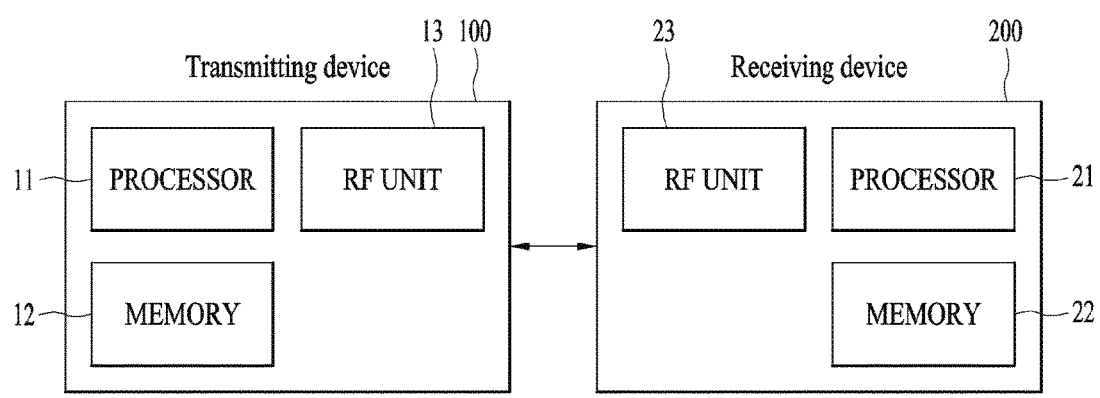
FIG. 7 is a block diagram illustrating elements of a transmitting device 100 and a receiving device 200 for implementing the present invention.

FIG. 7 is a block diagram illustrating elements of a transmitting device 100 and a receiving device 200 for implementing the present invention.

The transmitting device 100 and the receiving device 200 respectively include

Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

A UE processor according to the present invention is configured to control the RF unit to receive physical random access channel (PRACH) configuration information. The PRACH configuration information may include a periodicity value indicating time intervals at which the PRACH resources configured based on the PRACH configuration information occur and a start time of the configured PRACH resources. The PRACH configuration information may further include a periodicity value N, expressed in number of configured PRACH resources. The UE processor may determine a part of PRACH resources among PRACH resources configured based on the PRACH configuration information, if a RA procedure is triggered. In other words, the UE processor may determine a PRACN resources subset from among PRACH resources configured based on the PRACH configuration information, if a RA procedure is triggered. The UE processor is configured to control the RF unit to perform the RA procedure using only the determined part of the PRACH resources. The UE processor may determine that every N-th configured PRACH resource, starting from a specific PRACH resource for the RA procedure, among the PRACH resources configured based on the PRACH configuration information is corresponding to the part of PRACH resources, i.e., the PRACH resources subset for the RA procedure. The UE processor may be configured to determine that a configured PRACH resource occurring first after the RA procedure is triggered is the starting PRACH resource. Alternatively, the UE processor may be configured to determine the starting PRACH resource based on the identity of the UE. For example, the UE processor is configured to determine that a K-th configured PRACH resource after the RA procedure is triggered is the starting PRACH resource. K may be equal to (the identity of the UE) modulo N. K may be a random number among 0, 1, . . . , N−1. N may be a positive integer larger than 1. The UE may be an NB-IoT UE. The UE processor may be configured to control the RF unit to transmit a RA preamble of the RA procedure using only the determined part of the PRACH resources.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The embodiments of the present invention are applicable to a network node (e.g., BS), a UE, or other devices in a wireless communication system.

What is claimed is:

1. A method for performing, by a user equipment (UE), a random access (RA) procedure in a wireless communication system, the method comprising:
receiving, by the UE, physical random access channel (PRACH) configuration information;
determining, by the UE, a part of PRACH resources among PRACH resources configured based on the PRACH configuration information; and
performing, by the UE, the RA procedure using only the determined part of the PRACH resources,
wherein the PRACH configuration information includes a periodicity value N, expressed in number of configured PRACH resources,
wherein the determined part of PRACH resources are every N-th configured PRACH resource, starting from a starting PRACH resource for the RA procedure, among the PRACH resources configured based on the PRACH configuration information,
wherein the starting PRACH resource is a K-th configured PRACH resource after the RA procedure is triggered, and
wherein K=(an identity of the UE) modulo N.

2. The method according to claim 1,
wherein the starting PRACH resource is a configured PRACH resource occurring first after the RA procedure is triggered.

3. The method according to claim 1,
wherein the starting PRACH resource is determined based on the identity of the UE.

4. The method according to claim 1,
wherein N>1.

5. The method according to claim 1,
wherein the UE is a narrowband internet of things (NB-IoT) UE.

6. The method according to claim 1,
wherein an RA preamble of the RA procedure is transmitted using only the determined part of the PRACH resources.

7. The method according to claim 1,
wherein the PRACH configuration information includes the periodicity value N for indicating time intervals at which the PRACH resources are configured based on the PRACH configuration information and information on when the configured PRACH resources start.

8. A user equipment (UE) for performing a random access (RA) procedure in a wireless communication system, the UE comprising:
a transmitter and receiver, and
a processor, operatively coupled to the transmitter and receiver, wherein the processor is configured to:
control the receiver to receive physical random access channel (PRACH) configuration information;
determine a part of PRACH resources among PRACH resources configured based on the PRACH configuration information; and
perform the RA procedure using only the determined part of the PRACH resources,
wherein the PRACH configuration information includes a periodicity value N, expressed in number of configured PRACH resources,
wherein the determined part of PRACH resources are every N-th configured PRACH resource, starting from a starting PRACH resource for the RA procedure, among the PRACH resources configured based on the PRACH configuration information,
wherein the processor is configured to determine that a K-th configured PRACH resource after the RA procedure is triggered is the starting PRACH resource, and
wherein K=(an identity of the UE) modulo N.

9. The UE according to claim 8,
wherein the starting PRACH resource is a configured PRACH resource occurring first after the RA procedure is triggered.

10. The UE according to claim 8, wherein the processor is further configured to:
determine the starting PRACH resource based on the identity of the UE.

11. The UE according to claim 8,
wherein N>1.

12. The UE according to claim 8,
wherein the UE is a narrowband internet of things (NB-IoT) UE.

13. The UE according to claim 8, wherein the processor is further configured to:
   control the transmitter to transmit an RA preamble of the RA procedure using only the determined part of the PRACH resources.

14. The UE according to claim 8, wherein the PRACH configuration information includes the periodicity value N for indicating time intervals at which the PRACH resources are configured based on the PRACH configuration information and information on when the configured PRACH resources start.

* * * * *